US011029989B2

(12) United States Patent
Resende et al.

(10) Patent No.: US 11,029,989 B2
(45) Date of Patent: Jun. 8, 2021

(54) DISTRIBUTED NOTEBOOK KERNELS IN A CONTAINERIZED COMPUTING ENVIRONMENT

(71) Applicant: INTERNATIONAL BUSINESS MACHINES CORPORATION, Armonk, NY (US)

(72) Inventors: Luciano Resende, San Jose, CA (US); Kevin B. Bates, Sebastopol, CA (US); Frederick R. Reiss, Sunnyvale, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 243 days.

(21) Appl. No.: 16/180,014

(22) Filed: Nov. 5, 2018

(65) Prior Publication Data
US 2020/0142725 A1    May 7, 2020

(51) Int. Cl.
*G06F 9/455*    (2018.01)
*G06F 9/54*     (2006.01)
*H04L 12/66*    (2006.01)

(52) U.S. Cl.
CPC .......... *G06F 9/45558* (2013.01); *G06F 9/545* (2013.01); *H04L 12/66* (2013.01);
(Continued)

(58) Field of Classification Search
CPC .............. G06F 9/45558; G06F 9/545; G06F 2009/45595; G06F 2009/45583; G06F 2009/4557; H04L 12/66
See application file for complete search history.

(56) References Cited

U.S. PATENT DOCUMENTS 8,789,034 B1* 7/2014 Emelyanov .......... G06F 9/4406
                                                      717/169
9,652,273 B2    5/2017 Davis et al.
(Continued)

OTHER PUBLICATIONS

Grace Period Disclosure: Bates, K., "Scaling Jupyter Notebooks with Distributed Kernels," Developer UnConference, Zurich, SE, Jun. 21, 2018, (Slide presentation), IBM Corporation © 2018, 26 pg.
(Continued)

*Primary Examiner* — Dhairya A Patel
(74) *Attorney, Agent, or Firm* — Cuenot, Forsythe & Kim, LLC (57) ABSTRACT

Distributing kernels in a containerized computing environment includes executing, using computer hardware, a notebook server in a first container, wherein the notebook server is configured to communicate with a gateway in a second container, in response to a request for a kernel from the notebook server, the gateway requesting, using the computer hardware, a new container including the kernel from a container manager, instantiating, using the computer hardware, the new container including the kernel within a selected computing node of a plurality of computing nodes, publishing, using the computer hardware, communication port information for the new container to the gateway, and exchanging electronic messages, using the computer hardware, between the notebook server and the kernel through the gateway using the communication port information for the new container.

11 Claims, 5 Drawing Sheets

(52) U.S. Cl.
CPC ............. *G06F 2009/45575* (2013.01); *G06F 2009/45595* (2013.01)

(56) References Cited

U.S. PATENT DOCUMENTS

| | | | | |
|---|---|---|---|---|
| 9,692,666 | B2* | 6/2017 | Salokanto | H04L 41/0896 |
| 9,830,091 | B2* | 11/2017 | Venkatesan | G06F 3/0685 |
| 9,843,533 | B2 | 12/2017 | Turovsky et al. | |
| 10,599,494 | B2* | 3/2020 | Tan | G06F 9/546 |
| 2015/0095923 | A1 | 4/2015 | Sarid | |
| 2016/0266917 | A1* | 9/2016 | Emelyanov | G06F 9/4555 |
| 2017/0149843 | A1 | 5/2017 | Amulothu et al. | |
| 2018/0007556 | A1* | 1/2018 | Lu | H04W 12/086 |
| 2019/0222988 | A1* | 7/2019 | Maes | H04L 41/5035 |

OTHER PUBLICATIONS

Grace Period Disclosure: Resende, L., "Scaling Notebooks for Deep Learning Workloads," JupyterCon—2018, Aug. 23, 2018, (Slide presentation), IBM Corporation © 2018, 26 pg.

Grace Period Disclosure: Bates, K. et al., "Jupyter at Scale—Deep Learning & More," Jupyter Enterprise Gateway, JupyterCon—2018, Aug. 23, 2018, (Slide presentation), IBM Corporation © 2018, 14 pg.

IBM Corporation, "An Approach for the Efficient Administration and Scheduling of Computational Kernels on Cell BE Multi-Core Processors—SPE Kernel Chaining," [online] IP.com Prior Art Database Technical Disclosure, IPCOM000181499D, Apr. 3, 2009, <http://ip.com/IPCOM/000181499D>, 17 pg.

"Component Notification Framework for Sensing Kernel Events," [online] IP.com Prior Art Database Technical Disclosure, IPCOM000249095D, Feb. 4, 2017, <http://ip.com/IPCOM/000249095D>, 4 pg.

Benedicic, L, et al., "Portable, high-performance containers for HPC," arXiv preprint arXiv: 1704.03383, Apr. 11, 2017, 11 pg.

"Kernel Gateway Documentation," Release 0.5.0dev, Project Jupyter team, Apr. 4, 2016, Copyright © 2016, Project Jupyter, 29 pg.

* cited by examiner

Execute, using computer hardware, a notebook server in a first container, wherein the notebook server is configured to communicate with a gateway in a second container
602

---

In response to a request for a kernel from the notebook server, the gateway requests, using the computer hardware, a new container including the kernel from a container manager
604

---

Instantiate, using the computer hardware, the new container including the kernel within a selected computing node of a plurality of computing nodes
606

---

Publish, using the computer hardware, communication port information for the new container to the gateway
608

---

Exchange electronic messages, using the computer hardware, between the notebook server and the kernel through the gateway using the communication port information for the new container
610

DISTRIBUTED NOTEBOOK KERNELS IN A CONTAINERIZED COMPUTING ENVIRONMENT

STATEMENT REGARDING PRIOR DISCLOSURES BY THE INVENTOR OR A JOINT INVENTOR

The following disclosure(s) are submitted under 35 U.S.C. 102(b)(1)(A):

Scaling Jupyter Notebooks with Distributed Kernels; Kevin Bates; Jun. 21, 2018.

Scaling Notebooks for Deep Learning Workloads; Luciano Resende; Aug. 23, 2018.

Jupyter at Scale; Luciano Resende and Kevin Bates; Aug. 23, 2018.

BACKGROUND

This disclosure relates to notebook computing platforms and, more particularly, to notebook computing platforms operating in containerized computing environments.

A notebook refers to a Web-based application through which users may create and share documents. The documents may include live program code, equations, visualizations, and narrative text. Notebooks are often used by data scientists to build interactive applications. For example, notebooks may be used in fields and/or for purposes such as data cleaning and transformation, numerical simulation, statistical modeling, data visualization, and machine learning.

A notebook computing platform typically includes a notebook frontend, a notebook server, and one or more kernels. In general, the notebook frontend is capable of storing code and text notes (e.g., markdown text) in an editable document called the notebook. The notebook frontend is also capable of executing code stored in the notebook and further storing output generated from execution of that code within the notebook itself. The notebook frontend is typically implemented as a computing system executing a browser. The browser is capable of displaying a user interface for the notebook, allowing a user to interact with the notebook, and is capable of communicating with the notebook server. The notebook server is capable of saving and loading notebooks to the browser executing in the notebook frontend (e.g., a client device).

The notebook server is also capable of communicating with kernels. Kernels are similar to remote login sessions on a computing system in that kernels are capable of providing remote control for a program or code that is executing on the computing system. A kernel is capable of communicating with a process that executes code contained within the kernel. For example, a user is capable of interacting with a notebook by way of a browser and provide code and/or instructions. The notebook server may offload the code and/or instructions to a kernel for execution. Results from execution of the kernel may be provided to the notebook server and then to the browser for display to the user.

SUMMARY

In one or more embodiments, a method includes executing, using computer hardware, a notebook server in a first container, wherein the notebook server is configured to communicate with a gateway in a second container, in response to a request for a kernel from the notebook server, the gateway requesting, using the computer hardware, a new container including the kernel from a container manager, and instantiating, using the computer hardware, the new container including the kernel within a selected computing node of a plurality of computing nodes. The method can also include publishing, using the computer hardware, communication port information for the new container to the gateway and exchanging electronic messages, using the computer hardware, between the notebook server and the kernel through the gateway using the communication port information for the new container.

In one or more embodiments, a system includes computer hardware, having at least one processor, configured to initiate operations including executing a notebook server in a first container, wherein the notebook server is configured to communicate with a gateway in a second container, in response to a request for a kernel from the notebook server, the gateway requesting a new container including the kernel from a container manager, and instantiating the new container including the kernel within a selected computing node of a plurality of computing nodes. The operations can also include publishing communication port information for the new container to the gateway and exchanging electronic messages between the notebook server and the kernel through the gateway using the communication port information for the new container.

In one or more embodiments, a computer program product includes a computer readable storage medium having program code stored thereon. The program code is executable by computer hardware to perform operations. The operations include executing a notebook server in a first container, wherein the notebook server is configured to communicate with a gateway in a second container, in response to a request for a kernel from the notebook server, the gateway requesting a new container including the kernel from a container manager, and instantiating the new container including the kernel within a selected computing node of a plurality of computing nodes. The operations can also include publishing communication port information for the new container to the gateway and exchanging electronic messages between the notebook server and the kernel through the gateway using the communication port information for the new container.

DETAILED DESCRIPTION

This disclosure relates to notebook computing platforms and, more particularly, to notebook computing platforms in containerized computing environments. In accordance with the inventive arrangements described herein, a notebook computing platform is provided that can be used with a containerized computing environment to distribute and manage kernels. Conventional notebook computing platforms include a notebook server and one or more kernels. The kernels and the notebook server execute as local processes with a single computer server.

Being executed as local processes, the notebook server and the kernels impose resource constraints on the computer server. For example, though the notebook server and kernels can execute in a computing cluster, the notebook server and any kernels utilized by the notebook server are restricted to executing on a single computing node of the computing cluster despite the availability of other computing nodes in the computing cluster. The notebook server and kernels are capable of quickly consuming the available memory of the computing node. The notebook server, however, is unable to leverage the additional computing capacity of the other computing nodes in the computing cluster due to the constraint that kernels execute locally with respect to the notebook server.

In some cases, the notebook computing platform is implemented in a containerized computing environment. In such cases, the notebook server and the kernels are implemented within a single container that is stored and executed on a single computer server. Such is the case as the kernels are executed locally with respect to the notebook server, e.g., in the same container. Using this approach, the maximum amount of server resources thought to be needed by the notebook server and any/all kernels accessed by the notebook server must be allocated to the container including the notebook server and kernel(s) at startup of that container. The notebook server is only able to execute kernels up to the computing resource limits granted to the container at startup.

In accordance with the inventive arrangements described herein, the notebook server is containerized separately from the kernels. The notebook server is implemented within one container, while the kernels are implemented in one or more other containers. For example, each kernel can be implemented within a different container. By containerizing the notebook server independently from the kernels, the size of the container used for the notebook server can be significantly reduced. The container need not be created to accommodate an anticipated number of kernels. The maximum amount of server resources used by any/all kernels of a given notebook need not be pre-allocated to the container including the notebook server. When a kernel is needed, computing server resources may be allocated to a new container that is launched that includes the kernel. When the kernel is no longer needed, the computer server resources allocated to the kernel may be used for other purposes after the container is terminated.

In addition, because the kernel is implemented within a different container than the notebook server, the kernel need not execute on the same computer server. For example, in the context of a computing cluster having a plurality of networked computing nodes, the container that includes a kernel used by a notebook server can execute on a different physical computing node and/or a different virtual machine than is used to execute the notebook server. This capability can significantly improve computing performance of the computing cluster by avoiding overburdening the computing node that executes the notebook server and more efficiently distributing the workload relating to execution of a notebook by distributing kernels to different computing nodes throughout the computing cluster. As such, the notebook computing platform is able to fully leverage the computing cluster.

In addition, including kernels in individual containers that are also distinct from the container of the notebook server allows the kernels to be decoupled and executed remotely from the notebook server. The containers including kernels can be launched, started, stopped, interrupted, and terminated thereby releasing the resources allocated to the containers. In other words, the computing resources devoted to a particular kernel may be used for other purposes once the container including the kernel is terminated. As such, the computing cluster is capable of supporting greater workloads, supporting more users, and/or supporting more notebook servers.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
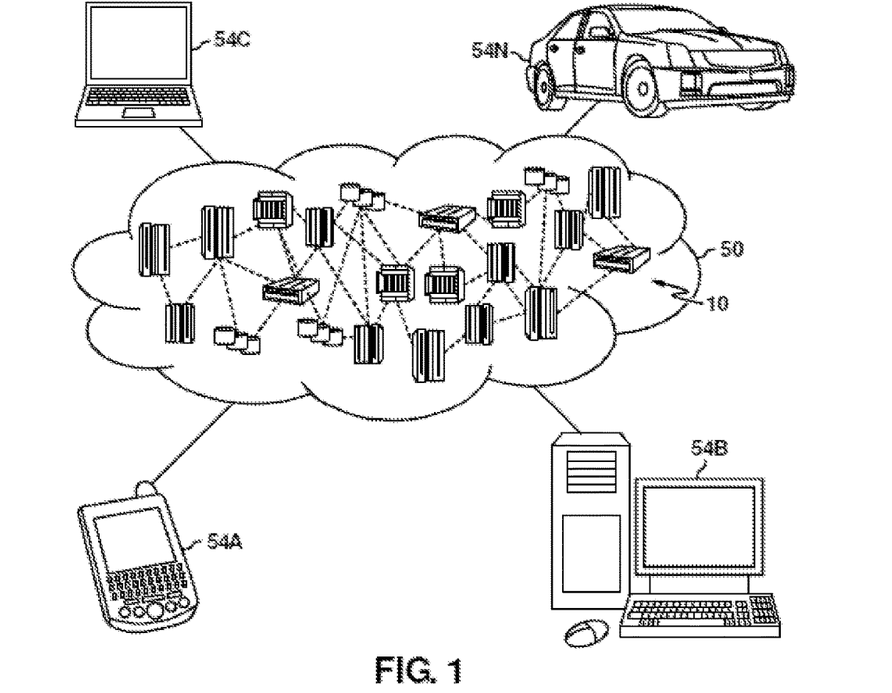
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
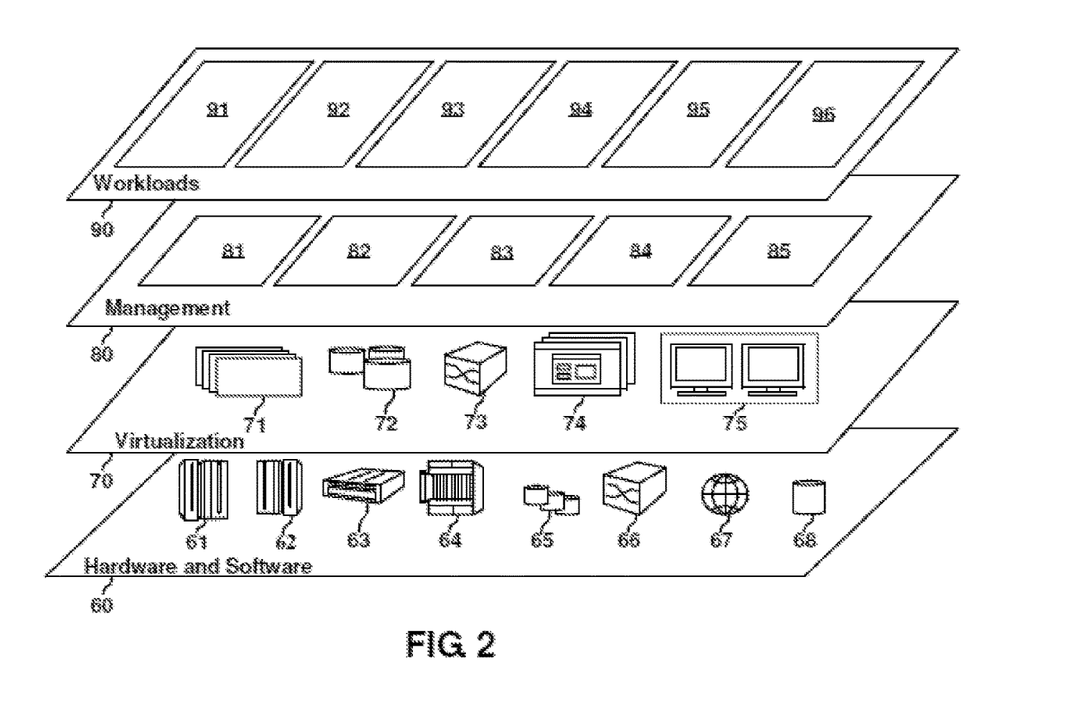
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a containerized notebook environment 96.

In one or more embodiments, containerized notebook environment 96 provides a notebook computing environment in which each notebook server included therein is implemented in a notebook server-specific container. Further, any kernels used by the respective containerized notebook servers are also implemented in individual kernel-specific containers. As kernels are needed by a given notebook server, the notebook server directs the kernel requests to a containerized gateway. The containerized gateway, for example, requests the creation of a container from a container manager on behalf of the notebook server. In response, the container manager instantiates a container that includes the kernel and a kernel controller. The container manager is capable of determining a location within the computing environment, e.g., a particular computing node and/or a particular virtual computing node, and instantiating the container including the kernel and the kernel controller on that computing node. Once instantiated, the kernel controller is capable of registering with the gateway. Since the gateway is aware of the particular location of the kernel within the multi-computing node environment, e.g., by virtue of interacting with the container manager, the gateway is capable of routing electronic messages between the containerized notebook server and the containerized kernel.

In particular embodiments, operations performed by kernels corresponding to a notebook server are capable of interacting with other layers and/or modules of the system illustrated in FIG. 2. For example, operations performed by one or more kernels are capable of interacting with data analytics processing 94. In another example, operations performed by one or more kernels are capable of interacting with database software 68. The particular examples provided are for purposes of illustration only and, as such, are not intended to be limiting. It should be appreciated that the particular layers and/or modules with which a kernel interacts will depend upon the purpose and/or functionality of that kernel.

Figure 3:
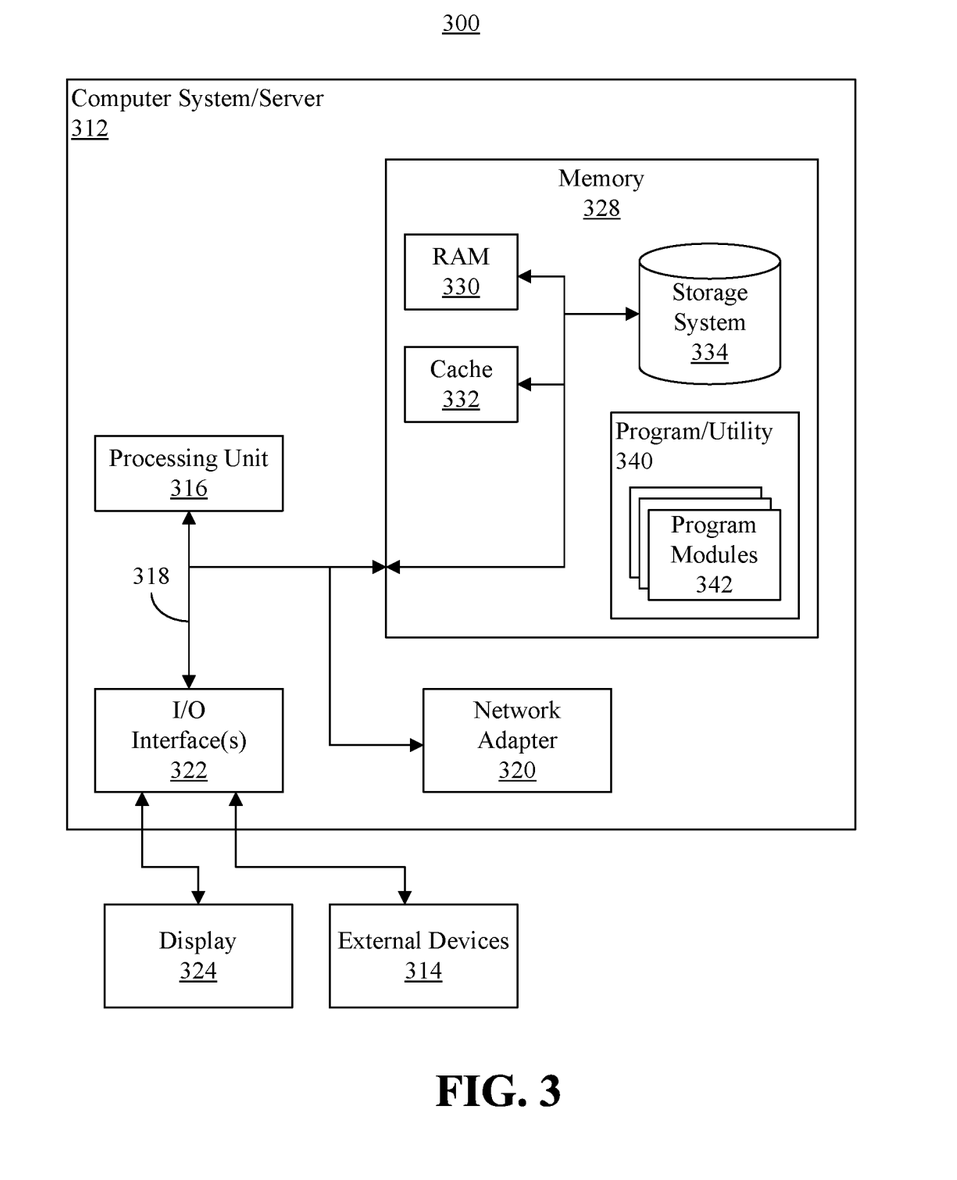
FIG. 3 depicts a cloud computing node according to an embodiment of the present invention.

Referring now to FIG. 3, a schematic of an example of a computing node is shown. Computing node 300 is only one example implementation of a computing node that may be used in a standalone capacity, as part of a computing cluster, or as a cloud computing node. The example of FIG. 3 is not intended to suggest any limitation as to the scope of use or functionality of embodiments of the invention described herein. Regardless, computing node 300 is capable of being implemented and/or performing any of the functionality set forth hereinabove. Computing node 300 is an example of computer hardware that is capable of performing the various operations described within this disclosure.

Computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 300 is shown in the form of a general-purpose computing device. The components of computer system/server 312 may include, but are not limited to, one or more processors 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system/server 312 typically includes a variety of computer system readable media. Such media may be any available media that is accessible by computer system/server 312 and can include both volatile and non-volatile media, removable and non-removable media.

Memory 328 can include computer system readable media in the form of volatile memory, such as random-access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may implement containerized notebook environment 96 or portions thereof. Program/utility 340 is executable by processing unit 316. Program/utility 340 and any data items used, generated, and/or operated upon by computing node 300 are functional data structures that impart functionality when employed by computing node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, as discussed, a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
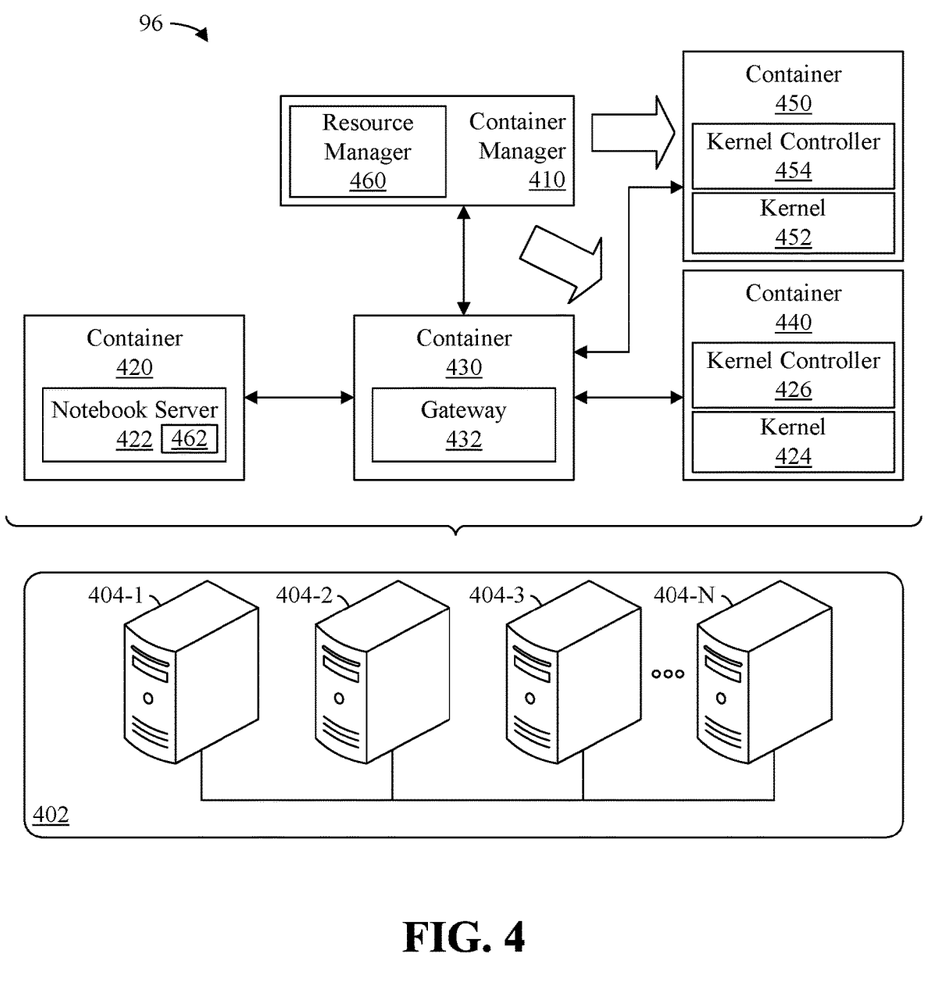
FIG. 4 illustrates an example of a computing cluster that is capable of executing a containerized computing environment according to an embodiment of the present invention.

FIG. 4 illustrates an example of a computing cluster 402 that is capable of executing containerized computing environment 96 according to an embodiment of the present invention. In the example of FIG. 4, computing cluster 402 includes a plurality of computing nodes 404-1, 404-2, 404-3, through 404-N. Computing nodes 404 may be implemented as described in connection with FIG. 3 and interconnected by any of a variety of network connections and/or architectures.

Containerized computing environment 96 includes a container manager 410 and a plurality of different containers 420, 430, 440, and 450. In general, container manager 410 is capable of managing containers by instantiating or launching containers as requested or needed within containerized computing environment 96 and terminating containers when no longer needed. As defined herein, a container is a standalone, executable software package that includes the resources needed to execute a particular application. A container can be implemented as a standardized unit of software that provides a mechanism by which the application and any resources needed by the application are able to execute in a resource-isolated process. For example, a container can include the program code, runtime, system tools, system libraries, and/or settings necessary to execute a given application. As such, containers provide application portability, ease of building and deployment, and have a small footprint in terms of computing resources and runtime overhead.

As part of instantiating a container, container manager 410 is capable of selecting a particular computing node 404 in which the container will be created (e.g., instantiated) and executed. In particular embodiments, the selection of a particular computing node in which a container is implemented is determined based on the workload of each computing node 404 at or about the time that the container is to be instantiated. In this manner, container manager 410 is capable of performing load balancing among the computing nodes 404, thereby allowing the notebook computing environment to leverage the capabilities of computing cluster 402. For example, container manager 410 is capable of determining which of computing nodes 404 has the largest computing capacity available (e.g., a lowest workload) and selecting that computing node in which to instantiate a new container. It should be appreciated that the particular techniques used to evaluate workloads of computing nodes 404 and of selecting the particular computing node 404 in which a container is to be instantiated can vary in complexity beyond that which is described. In any case, container manager 410 is capable of selecting the particular location, e.g., computing node 404, in which a container is instantiated.

Container 420 includes notebook server 422. Notebook server 422, which is implemented as program code, executes within container 420. As an illustrative and non-limiting example, notebook server 422 may be implemented as a Jupyter Notebook server or as another type of other notebook server that is capable of communicating using the Jupyter Message Protocol. For example, notebook server 422 can be implemented as a proprietary system or as an open source system capable of communicating using the Jupyter Message Protocol.

In the example of FIG. 4, notebook server 422 includes a server extension 462 that is capable of communicating with a gateway 432. Gateway 432, which is implemented as program code, executes within container 430. In the example of FIG. 4, container manager 410 has instantiated containers 440 and 450. Container manager 410 includes kernel 424 and kernel controller 426 within container 440. As such, both kernel 424 and kernel controller 426 execute within container 440. Container manage 410 includes 450 includes kernel 452 and kernel controller 454 within container 450. As such, both kernel 452 and kernel controller 454 execute within container 450.

In the example of FIG. 4, notebook server 422 is capable of providing a notebook to a client device. The client device, for example, can execute a browser that is used to execute and access the notebook. A user is capable of providing user input specifying code and/or other data to the notebook. The client device is capable of conveying the user inputs to notebook server 422. Notebook server 422 is capable of using a kernel to perform one or more operations relating to the user provided input corresponding to the notebook. In one or more embodiments, a kernel is implemented as program code that, when executed, provides a remote login session on a data processing system. A kernel can provide a mechanism for remote control of a program (e.g., a mechanism that is responsive to user provided input to the notebook). Rather than launch a new kernel locally, e.g., within container 420, notebook server 422, by way of server extension 462, sends a request to launch a new kernel to gateway 432.

Gateway 432 receives the request for a new kernel from notebook server 422. In response to the request for a new kernel from notebook server 422, gateway 432 submits a request for a new container including the new kernel to container manager 410 on behalf of notebook server 422. Container manager 410, in response to the request from gateway 432, is capable of determining a location within computing cluster 402 in which to launch a new container including the new (e.g., requested) kernel. In one or more embodiments, container manager 410 includes a resource manager 460 that determines which of computing nodes 404 on which to launch the new container. In particular embodiments, resource manager 460 is capable of determining the current workload of each of computing nodes 404 and selecting a particular computing node 404 based on the determined workload of each respective computing node 404. For example, resource manager 460 is capable of selecting the particular computing node 404 that has a smallest or lowest workload in which to launch the new container, which includes the new kernel and the kernel controller therein.

In one or more embodiments, the selected computing node 404 in which the new container is implemented is different from the particular computing node that is executing container 420. In one or more other embodiments, the selected computing node 404 in which the new container is implemented is also different from the particular computing node 404 that is executing container 430.

For purposes of illustration, consider the case where container manager 410 launches container 440 within computing node 404-3 based on an assessment of the workload of computing nodes 404. Subsequently, container manager 410 launches container 450 within computing node 404-4 based on another assessment of the workload of computing nodes 404. In launching each container, container manager 410 includes the requested kernel and a kernel controller for the requested kernel within the container. In particular embodiments, the kernel controller is implemented as a wrapper for the kernel. In general, the kernel controller is capable of coordinating communication between the kernel and gateway 432.

As an illustrative and non-limiting example, in response to the request for a new container, container manager 410 launches container 450 including the new kernel, e.g., kernel 452, and kernel controller 454. Container manager 410 is capable of configuring kernel controller 454 with the address of gateway 432 as part of launching container 450 so that kernel controller 454 is capable of communicating with gateway 432. For example, in launching container 450, container manager 410 is capable of passing a callback address of gateway 432 to kernel controller 454 as a parameter. Once container 450 is launched on a particular computing node 404, kernel controller 454 is capable of publishing contact information for container 450 to the callback address corresponding to gateway 432.

Gateway 432 is further capable of communicating with container manager 410 via an application programming interface (API) provided by container manager 410 to determine the particular location within computing cluster 402 in which container 450 is instantiated. In response to receiving the location information for container 450 from container manager 410, gateway 432 starts listening for port information on the response port (e.g., the callback address) from container 450. In this manner, gateway 432 is expecting the communication from kernel controller 454, which informs gateway 432 of the port information needed to communicate with kernel 452 and kernel controller 454.

In one or more embodiments, kernel controller 454 publishes the port information for kernel 452 back to gateway 432. In one aspect, the port information can include port information for kernel 452 specifying notebook communication protocol compliant communication ports that may be used within a conventional notebook computing environment (e.g., a Jupyter notebook computing environment) that allows a notebook server to communicate with a kernel. For example, the port information can include information for the following ports or "sockets" per the Jupyter Message Protocol: Shell, IOPub, stdin, Control, Heartbeat. The port information can also include a port for kernel controller 454. Using the port information and location of container 450 in computing cluster 402, gateway 432 is capable of establishing a communication link with container 450. More particularly, gateway 432 is capable of establishing a communication link with kernel 452 and kernel controller 454. As such, gateway 432 is capable of exchanging messages (e.g., "kernel messages") and/or information between notebook server 422 and kernel 452. Notebook server 422 is capable of communicating with kernel 452 through gateway 432 as if kernel 452 is executing within container 420 as a local process. In other words, notebook server 422 is unaware that kernel 452 is within a different container and or possibly within a different computing node 404 of computing cluster 402. Signaling that would be provided to kernel 452 from notebook server 422 as a local process were kernel 452 also implemented in container 420 is provided to container 450 and, as such, kernel 452 through messages conveyed through gateway 432.

Using the port information for kernel controller 454, gateway 432 is also capable of conveying messages relating to lifecycle management of kernel 452. For example, messages for starting execution of kernel 452, stopping execution of kernel 452, and/or interrupting operation of kernel 452 are directed to kernel controller 454. As an illustrative and nonlimiting example, notebook server 422 directs all communications intended for kernel 452 to gateway 432. Gateway 432 conveys messages intended for kernel 452 to the appropriate ports corresponding to kernel 452 executing within container 450. Gateway 432 directs those messages relating to lifecycle management, e.g., starting, stopping, and/or interrupting kernel 452, to kernel controller 454. Kernel controller 454 is capable of performing a signal write directly to the process executing kernel 452 within container 450, thereby allowing kernel controller 454 to perform the noted lifecycle management operations on kernel 452.

In conventional notebook computing environments where the kernels are launched locally with respect to the notebook server (e.g., in the same computing node and/or in the same container as the notebook server), the notebook server is capable of directly exercising control over the kernels since the kernels executed as local processes. The notebook server would simply start, stop (e.g., kill), or interrupt the process executing the kernel locally. In accordance with the inventive arrangements disclosed herein, since kernel 452 no longer executes as a local process of notebook server 422, kernel controller 454 is used to exercise such control over kernel 452 on behalf of notebook server 422. Kernel controller 454 is controlled via a separate communication port that is accessed by gateway 432.

Figure 5:
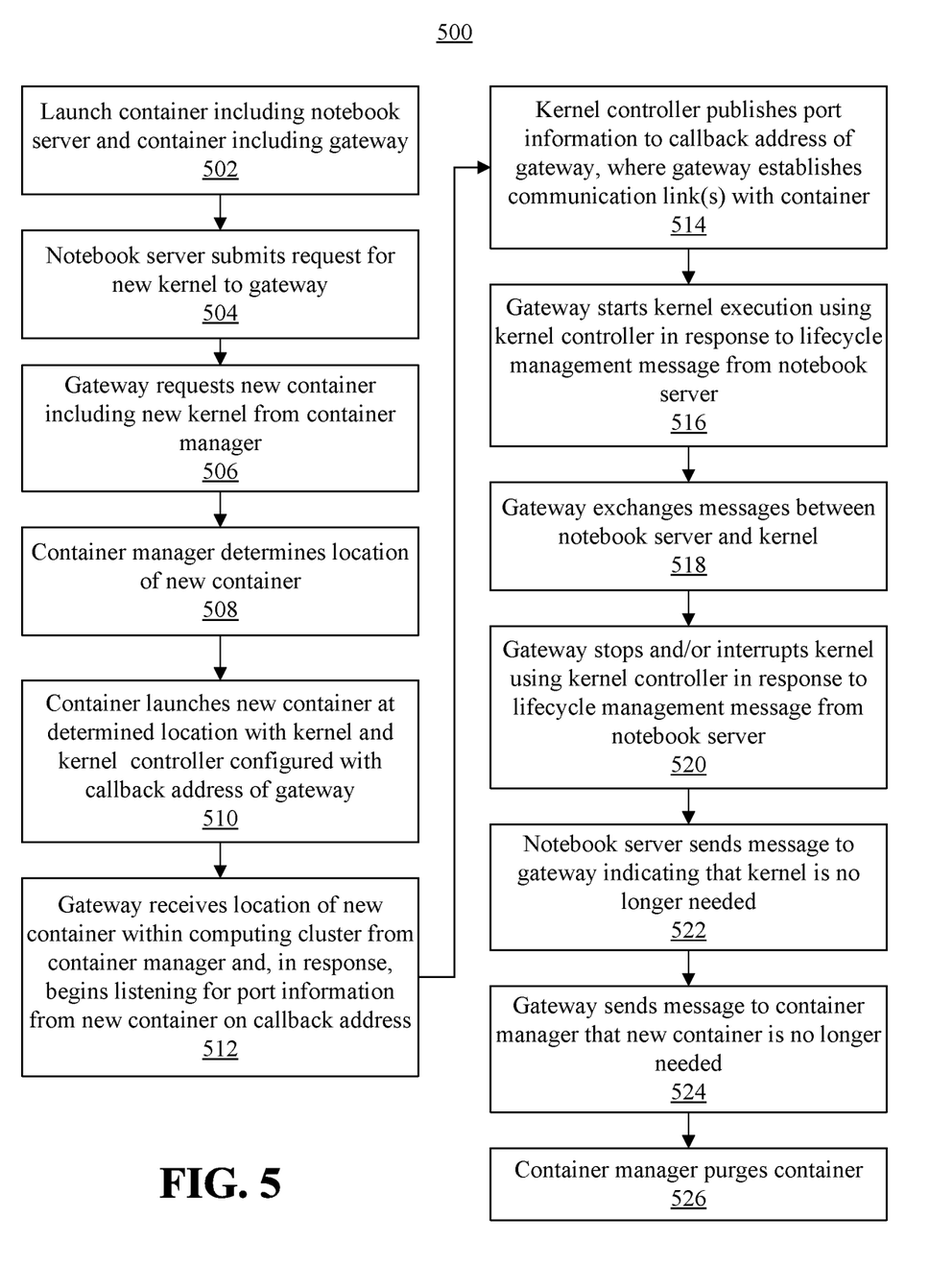
FIG. 5 illustrates a method of distributing kernels in a containerized computing environment according to an embodiment of the present invention.

FIG. 5 illustrates a method 500 of distributing kernels in a containerized computing environment according to an embodiment of the present invention. Method 500 can be performed by a system as described herein in connection with FIGS. 2, 3, and/or 4.

Method 500 can begin in block 502, where a container (e.g., a server container) is launched that includes a notebook server and another container (e.g., a gateway container) is launched that includes a gateway. The notebook server can begin executing in the server container. Similarly, the gateway can begin executing within the gateway container. The notebook server, as implemented within the server container, can include a server extension that is configured to communicate with the gateway.

In block 504, the notebook server submits a request for a new kernel to the gateway. For example, the notebook server can receive a request from a client device executing a notebook and requesting execution of program code. The notebook server, in response to the request from the client device, is capable of generating a request for a new kernel that is capable of executing the particular type of program code provided from the client device and submitting the request to the gateway.

In block 506, in response to receiving the request from the notebook server, the gateway requests a new container including the new (e.g., requested) kernel from the container manager. In block 508, the container manager determines a location for the new container. For example, the container manager is capable of selecting a particular computing node or virtual computing node within a computing environment having a plurality of such nodes on which to execute the new container.

In block 510, the container manager launches the new container at the determined location. The new container (e.g., kernel container) includes the new kernel and a kernel controller for the new kernel. Both the new kernel and the kernel controller are executed within the kernel container. The kernel controller is configured by the container manager upon implementation with a callback address for the gateway.

In block 512, the gateway receives the location of the new container within the computing environment (e.g., the computing cluster) from the container manager. For example, the gateway can use an API of the container manager to request the location of the new container from the container manager once the new container is instantiated on a computing node or virtual computing node. In another example, the container manager is capable of providing the location of the new container to the gateway in response to instantiating the new container on a particular computing node or virtual computing node. In response to receiving location information for the new container, the gateway begins listening on the port corresponding to the callback address for port information published from the new container.

In block 514, the kernel controller, once executing, publishes communication port information for the kernel container to the callback address of the gateway. As discussed, the port information can specify one or more communication ports corresponding to the kernel in accordance with the notebook communication protocol used between the notebook server and kernel in cases where the kernel is implemented as a local process within the same container as the notebook server. The port information can also include a port address for the kernel controller. The gateway already has location information for the new container obtained directly from the container manager. Using the location information and the port information, the gateway is capable of communicating with the kernel and/or the kernel manager in the new container. The gateway, in response to receiving the port information from the kernel controller, is capable of establishing communication link(s) with the kernel container. For example, the gateway is capable of establishing a communication link with the kernel and/or a communication link with the kernel controller within the kernel container.

In block 516, the gateway starts execution of the kernel using the kernel controller in response to a lifecycle management message from the notebook server. For example, the notebook server, in executing the notebook, may initiate execution or a processing job by the kernel. In doing so, the notebook server sends a message by way of the server extension to the gateway. The gateway is capable of analyzing messages received from the notebook server and distinguishing lifecycle management messages from other messages that occur in the normal and ordinary course of operation of the kernel. The gateway, in recognizing that the message is a lifecycle management message, directs the message to the communication port for the kernel controller. In response to receiving the lifecycle management message, the kernel controller within the kernel container starts execution of the kernel. The kernel controller, for example, is capable of executing any lifecycle management messages that are received such as starting execution of the kernel, stopping execution of the kernel, and/or interrupting execution of the kernel.

In block 518, the gateway exchanges messages between the notebook server and the kernel. For example, in executing the notebook, the notebook server continues sending kernel messages intended for the kernel to the gateway. The kernel messages are directed to the gateway by virtue of the server extension. The gateway forwards the kernel messages, e.g., messages that are not lifecycle management messages, to the appropriate port of the kernel per the Jupyter Message Protocol. Similarly, the kernel may send messages intended for the notebook server to the gateway. The gateway forwards the messages from the kernel to the notebook server.

For example, the notebook server can forward program code received from the client device to the gateway as one or more messages. An example of such a message can be an execute request message. The gateway can forward the message including program code to the kernel for execution. The kernel can send various messages back to the gateway. Example messages from the kernel that can be sent back to the gateway include, but are not limited to, a status message specifying "busy" which indicates that the kernel has received the request, an execute_input message indicating that the kernel is executing the program code, a display_data message providing results to be displayed, an execute_result message specifying results of execution, and/or a status message specifying "idle" indicating that the kernel has completed execution. The gateway can forward the messages received from the kernel to the notebook server. The notebook server further can forward any results to the client device for presentation.

In block 520, gateway stops and/or interrupts the kernel using the kernel controller in response to a lifecycle management message from the notebook server. For example, the notebook server can send a lifecycle management message to the gateway. The lifecycle management message can interrupt or stop the kernel. The gateway, in detecting that the received message is a lifecycle management message, forwards the message to the kernel controller. The kernel controller, in response to receiving the lifecycle management message, executes any commands included therein such as stopping or interrupting the kernel.

In block 522, the notebook server sends a message to the gateway indicating that the kernel is no longer needed. In block 524, the gateway, in response to receiving the message from the notebook server, sends a message to the container manager indicating that the new container is no longer needed. In block 526, the container manager terminates, e.g., deletes, the kernel container. As such any resources within the containerized computing environment previously allocated for executing the container are released and available to execute other containers. As such, resources of the computing cluster are only tied up when a kernel is in use and are released when the kernel is no longer needed.

In accordance with the inventive arrangements described herein, use of the server extension redirects communications intended for kernels from the notebook server to the gateway. As such, the notebook server is unaware that the notebook server is communicating through a remote port with a remote kernel. Signals that were provided to the kernel(s) locally, are now conveyed by way of the gateway through electronic messages. As an illustrative and nonlimiting example, a user may provide a "break" command such as "control-c" via the client device. The notebook server submits a message including the command to the gateway.

The gateway, in recognizing the message as a lifecycle management message, directs the message to the kernel controller instead of the kernel.

Figure 6:
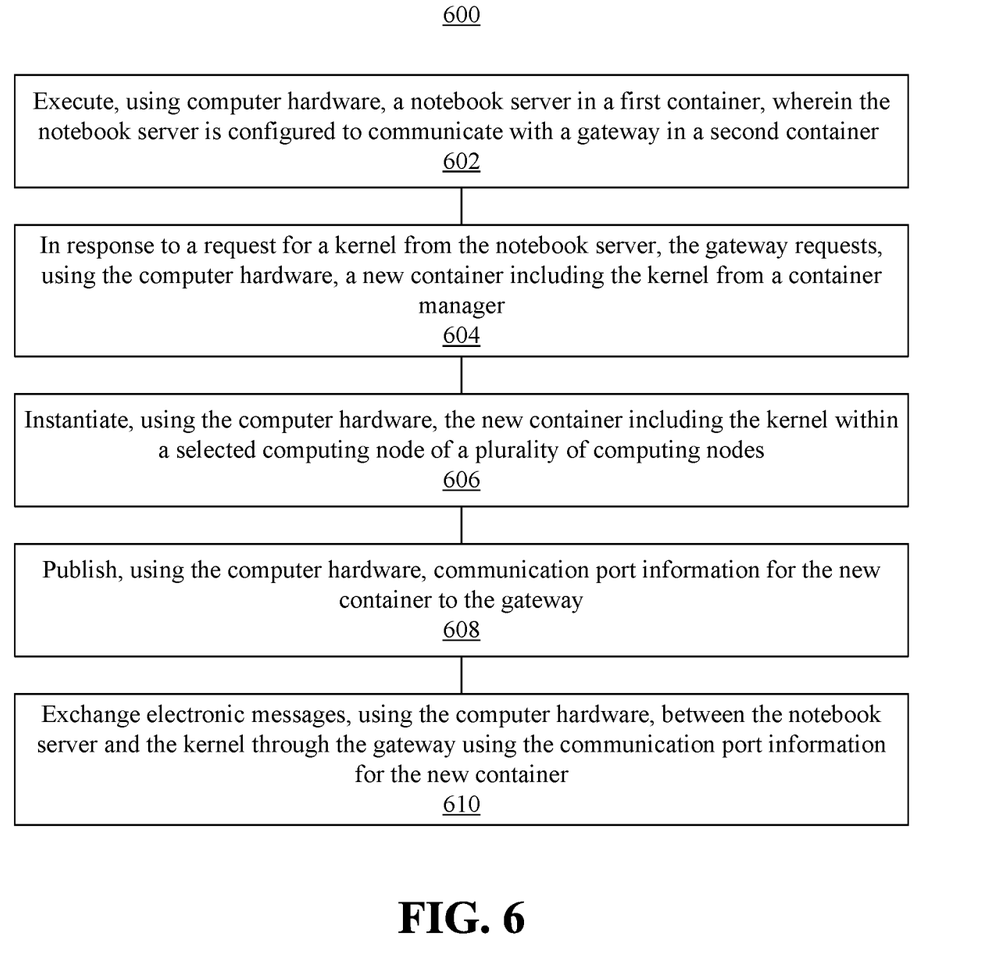
FIG. 6 illustrates another method of distributing kernels in a containerized computing environment according to an embodiment of the present invention.

FIG. 6 illustrates another method 600 of distributing kernels in a containerized computing environment according to an embodiment of the present invention. Method 600 may be performed by a system as described herein in connection with FIGS. 2, 3, and/or 4.

In block 602, computer hardware is used to execute a notebook server in a first container. The notebook server is configured to communicate with a gateway in a second container. The notebook server is also configured to communicate with a client device executing a notebook. The notebook server may execute in a computing node and/or a virtual computing node.

In block 604, the gateway, executing in the computer hardware and in response to a request for a kernel from the notebook server, requests, via the computer hardware, a new container including the kernel from a container manager.

In block 606, the computer hardware instantiates the new container including the kernel within a selected computing node of a plurality of computing nodes. The container manager, for example, instantiates the new container. In instantiating the new container, the kernel controller is provided a callback address for the gateway that is used to publish communication port information.

In block 608, the new container publishes communication port information to the gateway. The gateway further is capable of receiving a location for the new container within the computing environment. The location can specify the particular computing node and/or virtual computing node on which the new container was instantiated. The gateway is capable of listening for the communication port information on a particular port in response to receiving the location information from the container manager.

In block 610, the computer hardware exchanges electronic messages between the notebook server and the kernel through the gateway using the communication port information for the new container. The gateway further can use the location information for the new container including the kernel. The gateway, for example, is capable of receiving messages sent by the notebook server and intended for the kernel and forwarding the messages to the kernel. The gateway is also capable of receiving messages sent by the kernel and intended for the notebook server and forwarding the messages to the notebook server.

In exchanging messages, the gateway is further capable of distinguishing between lifecycle management messages and messages that are not lifecycle management messages (e.g., kernel messages per the Jupyter Messaging Protocol). The containerized gateway forwards those messages from the notebook server determined to be lifecycle management messages to a communication port corresponding to the kernel controller and forwards those messages from the notebook server that are not lifecycle management messages to a communication port or ports corresponding to the kernel.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    executing, using computer hardware, a notebook server in a first container, wherein the notebook server is configured to communicate with a gateway in a second container;
    in response to a request for a kernel from the notebook server, the gateway requesting, using the computer hardware, a new container including the kernel from a container manager;
    instantiating, using the computer hardware, the new container including the kernel within a selected computing node of a plurality of computing nodes;
    publishing, using the computer hardware, communication port information for the new container to the gateway;
    exchanging electronic messages, using the computer hardware, between the notebook server and the kernel through the gateway using the communication port information for the new container;
    wherein in response to receiving a lifecycle management message for the kernel from the notebook server, the gateway sending the lifecycle management message to a communication port of a kernel controller; and
    the kernel controller, in response to the lifecycle management message, performing a signal write to a process within the new container executing the kernel.

2. The method of claim 1, wherein the first container and the new container execute in different computing nodes of the plurality of computing nodes.

3. The method of claim 1, further comprising:
    choosing the selected computing node from the plurality of computing nodes to implement the new container.

4. The method of claim 1, further comprising:
    the gateway receiving a location indicating the selected computing node in which the new container is instantiated.

5. A system, comprising:
    computer hardware, having at least one processor, configured to initiate operations including:
    executing a notebook server in a first container, wherein the notebook server is configured to communicate with a gateway in a second container;
    in response to a request for a kernel from the notebook server, the gateway requesting a new container including the kernel from a container manager;
    instantiating the new container including the kernel within a selected computing node of a plurality of computing nodes;
    publishing communication port information for the new container to the gateway;
    exchanging electronic messages between the notebook server and the kernel through the gateway using the communication port information for the new container;
    wherein in response to receiving a lifecycle management message for the kernel from the notebook server, the gateway sending the lifecycle management message to a communication port of a kernel controller; and
    the kernel controller, in response to the lifecycle management message, performing a signal write to a process within the new container executing the kernel.

6. The system of claim 5, wherein the first container and the new container execute in different computing nodes of the plurality of computing nodes.

7. The system of claim 5, wherein the computer hardware is configured to initiate operations further comprising:
    choosing the selected computing node from the plurality of computing nodes to implement the new container.

8. The system of claim 5, wherein the computer hardware is configured to initiate operations further comprising:
    the gateway receiving a location indicating the selected computing node in which the new container is instantiated.

9. A computer program product comprising a computer readable storage medium having program instructions embodied therewith, the program instructions executable by computer hardware to cause the computer hardware to initiate operations comprising:
    executing a notebook server in a first container, wherein the notebook server is configured to communicate with a gateway in a second container;
    in response to a request for a kernel from the notebook server, the gateway requesting a new container including the kernel from a container manager;
    instantiating the new container including the kernel within a selected computing node of a plurality of computing nodes; publishing communication port information for the new container to the gateway;
    exchanging electronic messages between the notebook server and the kernel through the gateway using the communication port information for the new container;
    wherein in response to receiving a lifecycle management message for the kernel from the notebook server, the gateway sending the lifecycle management message to a communication port of a kernel controller; and
    the kernel controller, in response to the lifecycle management message, performing a signal write to a process within the new container executing the kernel.

10. The computer program product of claim 9, wherein:
    the first container executes in a first computing node of the plurality of computing nodes; and
    the second container executes in a second computing node of the plurality of computing nodes.

11. The computer program product of claim 9, wherein the program instructions are executable by the computer hardware to cause the computer hardware to initiate operations further comprising:
    choosing the selected computing node from the plurality of computing nodes to implement the second container.

* * * * *